(12) United States Patent  
Bhavnani

(10) Patent No.: US 7,455,191 B2
(45) Date of Patent: Nov. 25, 2008

(54) TRIANGULAR MUG AND ADVERTISING MEANS

(75) Inventor: Dilip Bhavnani, Beverly Hills, CA (US)

(73) Assignee: Sun Coast Merchandise Corporation, Commerce, CA (US)

( * ) Notice: Subject to any disclaimer, the term of this patent is extended or adjusted under 35 U.S.C. 154(b) by 617 days.

(21) Appl. No.: 11/012,540

(22) Filed: Dec. 14, 2004

(65) Prior Publication Data

US 2006/0124651 A1 Jun. 15, 2006

(51) Int. Cl.
  A47G 19/22 (2006.01)
  A47J 41/02 (2006.01)
  B65D 51/18 (2006.01)
(52) U.S. Cl. ............... 220/592.17; 220/592.27; 220/254.9; 220/713
(58) Field of Classification Search ............ 220/592.17, 220/592.27, 254.9, 254.3, 62.12, 62.18, 62.22, 220/713
  See application file for complete search history.

(56) References Cited

U.S. PATENT DOCUMENTS

| | | | |
|---|---|---|---|
| 2,899,098 A | 8/1959 | Gits | |
| 3,927,443 A * | 12/1975 | Brumlik | 24/449 |
| 5,062,542 A * | 11/1991 | Morton | 220/269 |
| D335,728 S | 5/1993 | Dziersk et al. | |
| D358,916 S * | 5/1995 | Barbieri | D34/1 |
| 5,588,561 A | 12/1996 | Ness | |
| D399,392 S | 10/1998 | Husted | |
| D407,597 S | 4/1999 | Diehl | |
| 5,906,279 A * | 5/1999 | Bergholtz et al. | 206/515 |
| 5,918,761 A * | 7/1999 | Wissinger | 220/713 |
| D441,609 S * | 5/2001 | Hsu | D7/531 |
| 6,237,801 B1 * | 5/2001 | Liu | 220/592.17 |
| D458,081 S | 6/2002 | Bodum | |
| D470,361 S | 2/2003 | Trombly | |
| D476,193 S | 6/2003 | Janky | |
| D480,268 S | 10/2003 | Laib | |
| D490,272 S | 5/2004 | Rohe | |
| D492,158 S | 6/2004 | Bodum | |
| 6,752,287 B1 * | 6/2004 | Lin | 220/254.9 |
| D492,546 S | 7/2004 | Bodum | |
| D498,979 S | 11/2004 | Bhavnani | |
| 7,086,545 B2 * | 8/2006 | Mannion et al. | 211/181.1 |
| D533,402 S * | 12/2006 | Bin | D7/510 |
| 2002/0027137 A1 * | 3/2002 | Price et al. | 220/23.87 |
| 2003/0029876 A1 * | 2/2003 | Giraud | 220/592.17 |
| 2005/0184078 A1 * | 8/2005 | Oas | 220/756 |

* cited by examiner

Primary Examiner—Anthony D Stashick
Assistant Examiner—Niki M. Eloshway
(74) Attorney, Agent, or Firm—The Soni Law Firm

(57) ABSTRACT

A beverage container having three elongated generally planar side surfaces with three rounded or blunted side edges and three corresponding pouring apexes at the triangular mouth thereof, sealed by a removable triangular lid with a V-shaped orifice, to provide improved pouring and liquid flow characteristics. The triangular configuration of the container enables it to be tightly nested with other identical containers and also presents more planar and discrete outer surface areas for disposing advertising material thereon. The container comprises an inner and outer shell affixed together at open ends thereof.

12 Claims, 2 Drawing Sheets

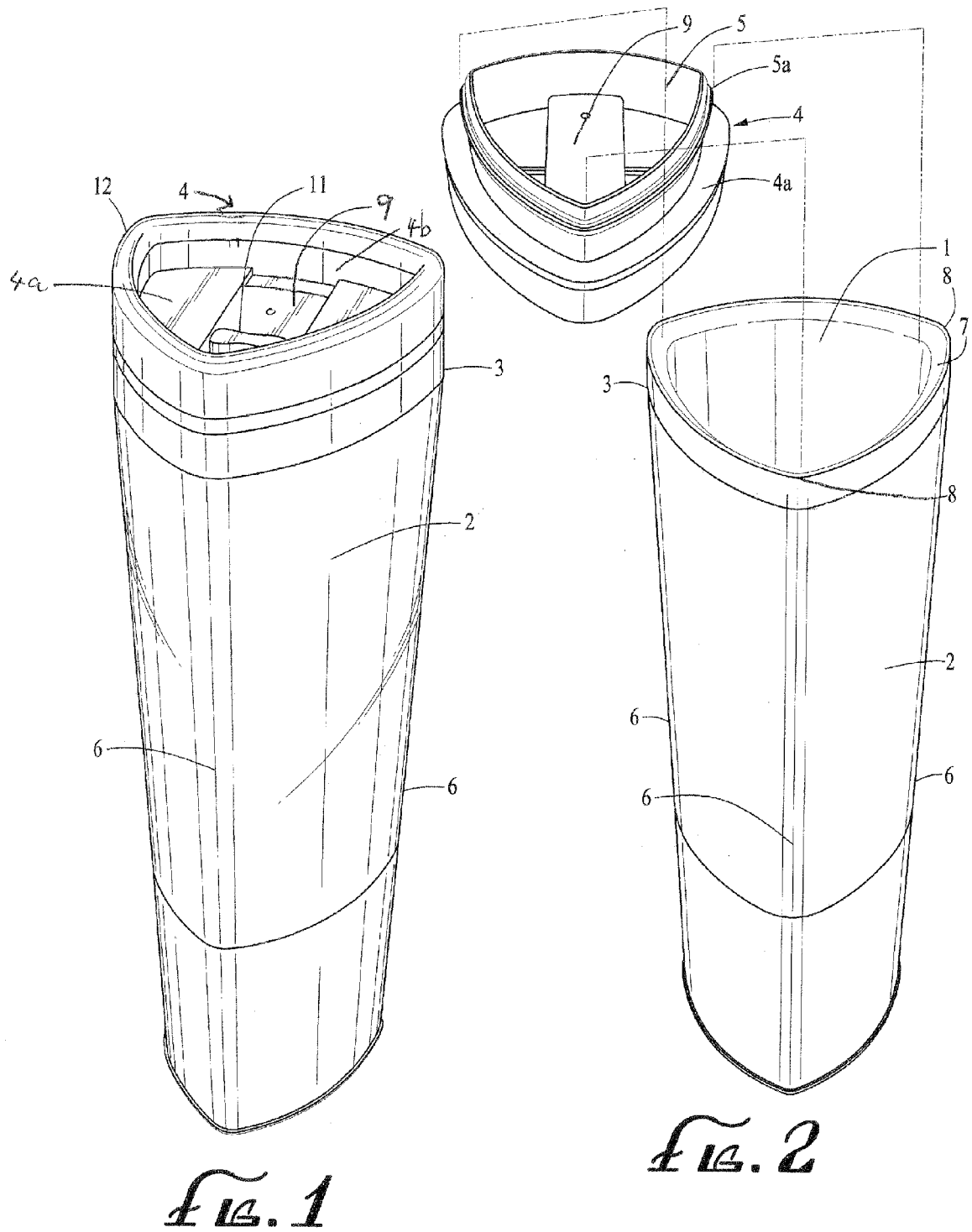

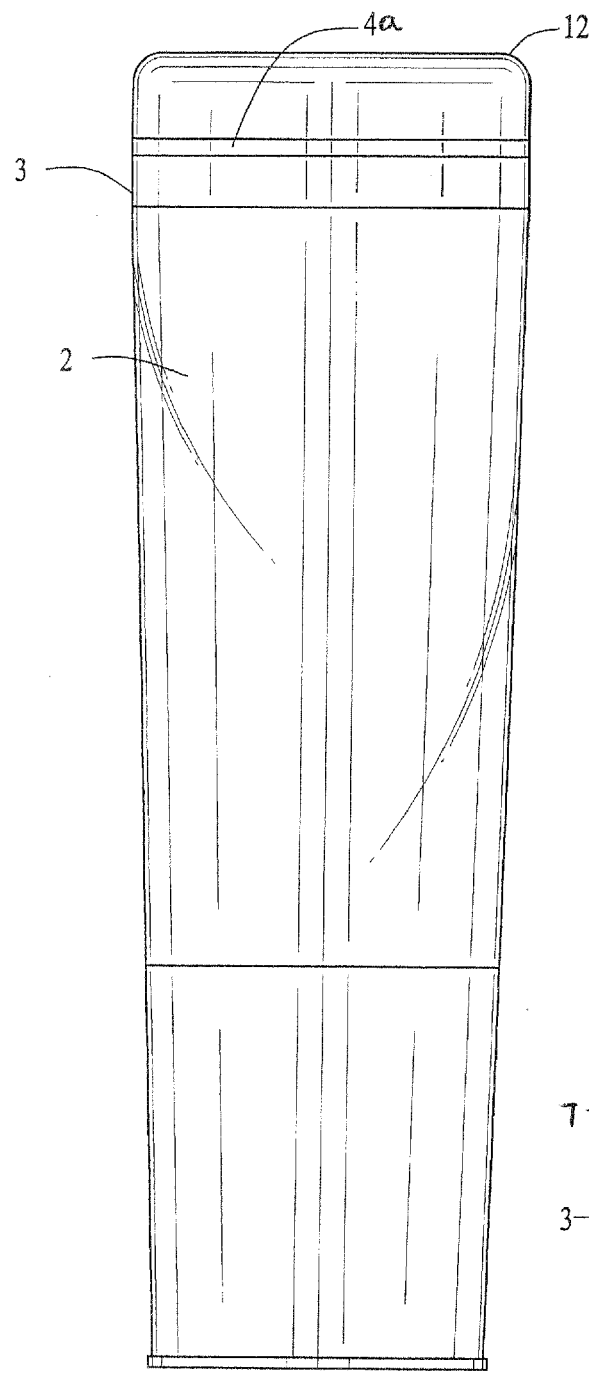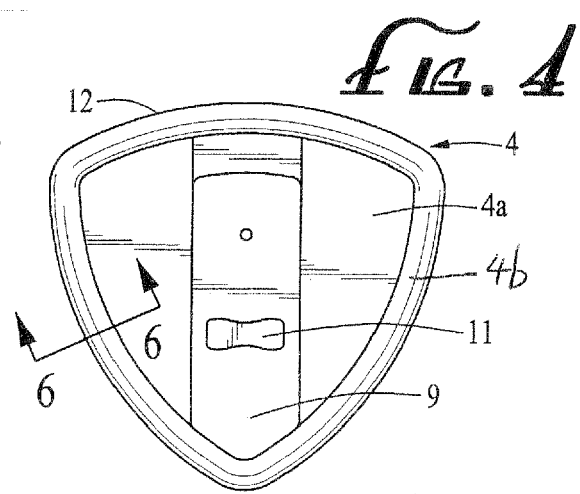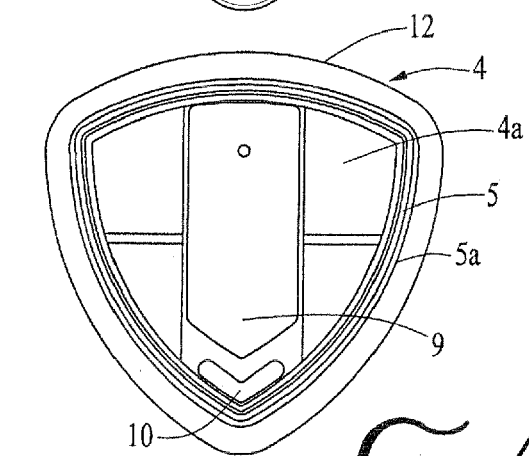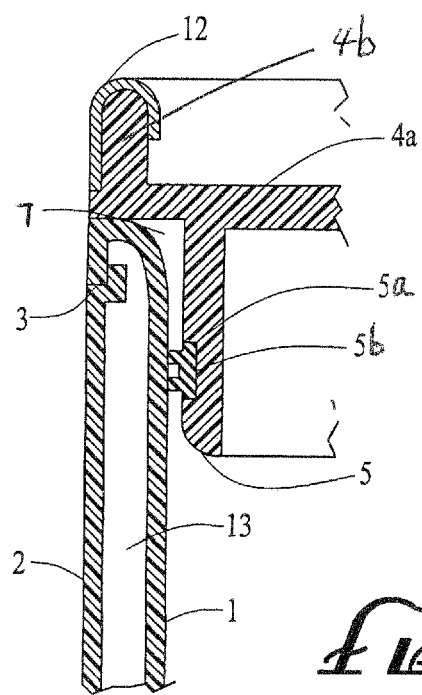

TRIANGULAR MUG AND ADVERTISING MEANS

BACKGROUND OF THE INVENTION

The present invention relates to a new container for beverages which may be used for hot or cold liquids and permits its user to more readily access the liquid in the container, pour liquid from the container in a more uniform manner and store or package groups of containers in a significantly more compact space than conventional drinking cups or mugs. The base of the present invention is sized for convenient use during travel as it fits in most, if not all standard automotive cup holders. Additionally, the geometry of this container design readily facilitates the imprinting of graphical images or text on numerous surfaces which each consist of larger radii curved surfaces which reduce the distortion of the printed image and increase the usable space for such imprinting.

Insulated cups or mugs for use as beverage containers are well known. Such containers are commonly used as drinking vessels for hot or cold beverages. On occasion, these types of containers are also used as an advertising medium whereby graphical material such as a company logo are imprinted on the side of the container about its circumference. A significant disadvantage of the existing mugs and cups is that they are typically configured in a round cylindrical shape. Such a shape is inherently disadvantageous because the conventional circumferential shape does not facilitate easy pouring of the liquid in a concentrated stream or other pattern from the container, thereby increasing the propensity of the liquid to overspill from the container. The present invention also provides the user with the option of receiving liquid from the apex of two adjacent sides, thereby permitting a more controlled flow of the liquid for easier consumption, particularly of hold beverages. The present invention also may include a sealed cover lid so as to facilitate its portability for carrying beverages the container with less or no spillage.

In addition, the circular shape is not an efficient use of space and requires significantly more cubic space in which to package a group of identical containers, such as for shipping, than would an array of closely nested triangular shapes.

Lastly, the round cylindrical shape of conventional mugs or cups does not easily facilitate the imprinting of graphical material for many reasons. As the circumference of the mug presents a highly curved surface about a relatively small radius, it is prone to distortion of the printed image. Additionally, as the circumference is one continual surface, there are no clear demarcation characteristics on the container outer surface, about which one may print multiple independent images in a non-confusing fashion. The present invention, having its outer surfaces of a more coplaner convexity than a conventional round container, presents greater total surface area upon which one may imprint than does a conventional round container having the same average outside diameter and the same overall height.

For the foregoing reasons, there is a need for a beverage container that is constructed in a non-circular shape, such as a triangular cylindrical configuration, which provides improved pouring characteristics, more compact nesting shape, convenient size for fitting in a cup holder and which has improved surfaces on which one may imprint commercial or advertising text or graphics.

SUMMARY OF THE INVENTION

The present invention provides for a beverage container comprising an insulated vessel having an inner shell and an outer shell which are spaced apart from each other, but rigidly affixed together at open ends thereof so as to form a mouth of the container thereat and create an insulating cavity between the inner and outer shell. Both the inner and outer shell have three elongated generally planar side surfaces with a triangular cross section, and the outer shell has three rounded or blunted side edges aligned with three apexes of two ends thereof. The preferred embodiment of the invention includes a sealing lid having a V-shaped drinking orifice to present the invention as a travel drinking container for use with hot or cold beverages.

The present invention satisfies the needs for a small sized, insulated beverage container from which a liquid may be poured in a uniformly controlled flow with reduced spillage when compared to conventional cylindrically shaped drinking containers. With its triangular shape and rounded edges, the pouring of a liquid from one of the three apexes of the mouth of the container, and further through the V-shaped orifice of the lid located right above the apex, is funneled into a uniform flow such that the beverage may be poured from the container in a safer, more accurate and controlled fashion than that from a conventional cylindrically shaped container. This feature provides the user with improved control of the flow which is particularly important to reduce spilling accidents when consuming hot beverages. In addition, the present invention is sized such that its base will fit in commonly found automotive cup holders.

Further, the present invention satisfies the need for improved cost and efficiency related to shipment and/or storage of multiple similarly shaped containers in both commercial and home locations, as its triangular shape facilitates improved nesting between containers, thereby requiring less volume within which a group of containers may be kept when compared to conventional round cylindrical beverage containers.

The present invention also satisfies the need for a beverage container that can serve as an advertising vehicle, as the generally planar or large radii side surfaces of the container provide the advantages of less imprint distortion, greater imprint surface area, and more discrete surfaces when compared to conventional cylindrically shaped beverage containers that provide only one, non-discrete, round side surface.

BRIEF DESCRIPTION OF THE DRAWINGS

FIG. 1 is a perspective view of a preferred embodiment in the present invention with a lid mounted;

FIG. 2 is a front perspective view of a preferred embodiment in the present invention, separately showing a front perspective inverted view of the lid;

FIG. 3 is a side view of a preferred embodiment in the present invention, showing one of its three side surfaces;

FIG. 4 is a top plan view of the lid made in a preferred embodiment of the present invention;

FIG. 5 is a bottom plan view of the lid made in a preferred embodiment of the present invention; and FIG. 6 is a cross sectional view of the upper portion of the container with the lid mounted, made in a preferred embodiment of the present invention.

DETAILED DESCRIPTION OF THE INVENTION

Referring to FIG. 1, a perspective view of a preferred embodiment of the present invention, a beverage container with a lid, is illustrated. As indicated above, although the beverage container in the preferred embodiment is depicted as having a triangular configuration, its cross section may be of any non-circular geometric shape in another embodiment and such an embodiment would still possess each of the key attributes of the invention. The beverage container in the preferred embodiment comprises an elongated outer shell (2), an inner shell (1) sized and configured to fit in the outer shell (2), and a removable lid (4). The inner shell (1) has opposing open and closed inner shell ends and a hollow interior extending therebetween to define a receptacle for containing beverages therein. The outer shell (2) has opposing open and closed outer shell ends and a longitudinal axis extending therebetween. In the preferred embodiment, each of the inner and outer shells, (1) and (2), consists of three identical, generally planar elongated side surfaces to define a generally triangular overall shape as shown in FIG. 2. The three side edges (6) formed between adjacent two side surfaces of the outer shell (2) are rounded or blunted, so as not to present a sharp or distinct line edge shape. The open inner shell end forms a inwardly chambered or beveled mouth of the container (7), sloping inward toward the open interior of the inner shell (1). This container mouth (7) has a generally triangular circumference conforming to the overall shape of the outer shell (2), and defines three pouring apexes (8) at positions it meets with the three side edges (6) of the outer shell (2). The outside surface of the outer shell (2) presents three distinct surfaces on which imprinting may be disposed.

The lid (4) of the present invention, as shown in FIGS. 2, 4 and 5, comprises a substantially planar triangular lid cover (4a) with three apexes and a male lower end (5), which extends from the lid cover (4a) down into the inner shell (1) when the lid (4) is removably mounted on the container mouth (7). The outer surface of the male lower end (5) has a flexible lipped seal (5a) which is inserted into a groove (5b) or other similar radial cavity formed in the inner surface of the inner shell (1) adjacent the open inner shell end. The lid (4) further comprises a ridge (4b) raised from the triangular circumferential edge of lid cover (4a) upwardly, that is, opposite the male lower end (5). Such a ridge (4b), preferably integrally formed with the lid cover (4a), would help confine any liquid left on the lid cover (4a) within the ridge so as to prevent the liquid from dripping down the container. The lid (4) also includes a slidingly displaceable member (9), the displacement of which selectively provides or prevents access to a small V-shaped orifice (10) defined on the lid cover (4a) adjacent one of the three apexes thereof through which the user may drink the encapsulated beverage. In the preferred embodiment, the displaceable member (9) is a sliding plate which includes a protrusion (11), as shown in FIGS. 1 and 4, which the user grasps to slide the displaceable member (9) away from the orifice (10). The particular shape of the orifice (10) on the lid cover (4a) shown in FIG. 5 in the preferred embodiment helps, together with the triangular shape of the container mouth (7) therebelow, pour the liquids out of the container in a more controlled and concentrated flow.

As illustrated in FIG. 6, the inner shell (1) and outer shell (2) are rigidly affixed to one another by adhesion through common methods known to those skilled in the art, at the circumferential mating surface (3) adjacent their respective open ends. The affixture ot the inner shell (1) to the outer shell (2) forms a closed cavity (13) between the inner and outer shells, to facilitate the insulation characteristics of the invention.

Depending on different embodiments of the invention one or both of the inner shell (1) outer shell (2) may be fabricated of a polymer based material or of a metallic material. The inner shell (1) may comprise three identical side surfaces with a triangular cross section so as to correspond to the shape of the mating outer shell (2) as shown in the figures of the preferred embodiment. Or in another embodiment(not shown), the inner shell (1) may have a round cylindrical side surface, of an outside diameter such that it may fit within the outer shell (2) for affixing the inner shell (1) to the outer shell (2).

In one embodiment, the closed cavity (13) may be evacuated during assembly and affixture of the inner shell (1) to the outer shell (2) so as to create a vacuum in the cavity (13) for improved insulating capability of the invention. Alternatively, the cavity (13) may be filled with an insulating material commonly known to those skilled in the art, so as to enhance the invention's capability to maintain the contained beverage at or near a desired temperature, In yet another embodiment, the lid (4) may further include a top ring (12) which is snugly fitted about a top circumferential edge of the ridge (4b) of the lid (4) so as to prevent nicks or damage to the otherwise exposed ridge (4b).

While the preferred embodiment of the present invention discussed hereinbefore and depicted in the drawings has a triangular configuration, any non-circular geometric shape having at least two distinct side surfaces is also within the scope of the present invention. Having multiple generally planar side surfaces with mating edges results in the invention's key advantages, that is, a smooth and controlled liquid flow from angled, beveled pouring edges, and increased efficiency in nesting and handling of multiple containers as described above. In addition, each of the distinct generally planar outer surfaces of the present invention would present an excellent surface for the imprinting of advertising or graphical materials for the purposes of advertising or promotion.

What is claimed is:

1. A beverage container comprising:

generally identically-shaped elongated outer and inner shells, each of the shells having generally triangular opposing open and closed shell ends, each of the shell ends having three apexes, each of the shells further having three contiguous generally planar side surfaces extending between the respective open and closed shell ends so as to define a generally triangular cross section therebetween and three respective side edges with two of the three side surfaces being joined together, the side edges of each shell being aligned respectively with the apexes of the shell ends thereof, the side edges of the outer shell having a blunt profile, the inner shell being fitted into, and spaced-apart from the outer shell such that the three side edges of the respective shells are aligned together, the inner shell defining a hollow interior extending between the inner shell ends for containing liquids therein, the open inner and outer shell ends being rigidly affixed together to form a triangular mouth of the container; and a lid removably and sealingly fitted upon the mouth of the container, the lid comprising a lid cover having a generally triangular circumferential edge with three apexes, the lid cover defining a V-shaped orifice thereon adjacent one of the apexes thereof for pouring the liquids in a controlled and concentrated flow therethrough.

2. The beverage container of claim 1, wherein at least one shell is fabricated from a polymer material.

3. The beverage container of claim 1, wherein at least one shell is fabricated from a metallic material.

4. The beverage container of claim 1 wherein each of the side surfaces of the outer shell is at least partially convexly curved.

5. The beverage container of claim 1, wherein the closed outer shell end is of an appropriate size so as to fit into an automotive cup holder.

6. The beverage container of claim 1, wherein graphical or advertising material is imprinted on at least one of the side surfaces of the outer shell for the purpose of advertising or promotion.

7. The beverage container of claim 1, wherein the lid further includes a slidable member disposed upon the lid cover, the slidable member being configured to selectively and slidably cover the orifice.

8. The beverage container of claim 1, wherein the lid further comprises a ridge raised upwardly from the circumferential edge of the lid cover for confining, thereby, any liquid left on the lid cover.

9. The beverage container of claim 1, wherein the the mouth of the container has a smooth inwardly beveled circumferential edge.

10. The beverage container of claim 1, wherein the outer shell is slightly tapered toward the closed outer shell end.

11. The beverage container of claim 1, wherein the inner and the outer shells define a vacuum cavity therebetween for insulation.

12. A method of advertising or promotion comprising the steps of:
   a) providing a beverage container comprising;
      generally identically-shaped elongated outer and inner shells, each of the shells having generally triangular opposing open and closed shell ends, each of the shell ends having three apexes, each of the shells further having three contiguous generally planar side surfaces extending between the respective open and closed shell ends so as to define a generally triangular cross section therebetween and three respective side edges with two of the three side surfaces being joined together, the side edges of each shell being aligned respectively with the apexes of the shell ends thereof, the side edges of the outer shell having a blunt profile, the inner shell being fitted into, and spaced-apart from the outer shell such that the three side edges of the respective shells are aligned together, the inner shell defining a hollow interior extending between the inner shell ends for containing liquids therein, the open inner and outer shell ends being rigidly affixed together to form a triangular mouth of the container, and
      a lid removably and sealingly fitted upon the mouth of the container, the lid comprising a lid cover having a generally triangular circumferential edge with three apexes, the lid cover defining a V-shaped orifice thereon adjacent one of the apexes thereof for pouring the liquids in a controlled and concentrated flow therethrough; and
   b) disposing advertising material on an outer surface of the container.

* * * * *